United States Patent [19]

Matsuoka et al.

[11] Patent Number: 5,611,831
[45] Date of Patent: Mar. 18, 1997

[54] DIESEL PARTICULATE FILTER APPARATUS

[75] Inventors: Hiroshi Matsuoka, Yamato; Hideo Kawamura, Samukawa; Akira Higashino, Yokohama; Toshiaki Sakaguchi, Fujisawa, all of Japan

[73] Assignee: Isuzu Ceramics Research Institute Co., Ltd., Kanagawa-ken, Japan

[21] Appl. No.: 556,269

[22] Filed: Nov. 13, 1995

[30] Foreign Application Priority Data

Nov. 16, 1994 [JP] Japan .................. 6-307023
Nov. 21, 1994 [JP] Japan .................. 6-309439
Dec. 6, 1994 [JP] Japan .................. 6-330227

[51] Int. Cl.$^6$ .................................................. B01D 29/07
[52] U.S. Cl. .................. 55/486; 55/498; 55/501; 55/521; 55/523; 55/527; 55/DIG. 30
[58] Field of Search ................ 55/484, 486, 487, 55/497, 501, 521, 523, 527, DIG. 10, DIG. 30

[56] References Cited

U.S. PATENT DOCUMENTS

| | | | |
|---|---|---|---|
| 3,849,181 | 11/1974 | Matsuoka et al. ............... | 117/106 R |
| 4,193,780 | 3/1980 | Cotton, Jr. et al. ............... | 55/484 X |
| 4,283,210 | 8/1981 | Mochida et al. ............... | 55/DIG. 30 |
| 4,398,931 | 8/1983 | Shevlin ............... | 55/523 X |
| 4,455,823 | 6/1984 | Bly et al. ............... | 60/311 |
| 4,517,090 | 5/1985 | Kersten et al. ............... | 210/493.2 |
| 4,576,799 | 3/1986 | Wörner et al. ............... | 55/484 X |
| 4,761,323 | 8/1988 | Mühlratzer et al. ............... | 55/523 X |
| 4,878,930 | 11/1989 | Manniso et al. ............... | 55/521 X |
| 4,902,314 | 2/1990 | Mizukami et al. ............... | 55/523 X |
| 4,902,319 | 2/1990 | Kato et al. ............... | 55/523 |
| 4,923,487 | 5/1990 | Bogart et al. ............... | 55/484 X |
| 5,171,341 | 12/1992 | Merry ............... | 55/484 |
| 5,174,969 | 12/1992 | Fischer et al. ............... | 55/484 X |
| 5,190,571 | 3/1993 | Fay et al. ............... | 55/523 |
| 5,196,120 | 3/1993 | White ............... | 55/527 X |
| 5,228,891 | 7/1993 | Adiletta ............... | 55/484 |
| 5,248,481 | 9/1993 | Bloom et al. ............... | 55/484 X |
| 5,248,482 | 9/1993 | Bloom ............... | 55/484 X |
| 5,250,094 | 10/1993 | Chung et al. ............... | 55/523 |
| 5,258,164 | 11/1993 | Bloom et al. ............... | 55/484 X |
| 5,298,046 | 3/1994 | Peisert ............... | 55/486 |
| 5,453,116 | 9/1995 | Fischer et al. ............... | 55/486 X |
| 5,454,845 | 10/1995 | Anahara et al. ............... | 55/487 X |
| 5,458,664 | 10/1995 | Ishii et al. ............... | 55/DIG. 30 |

FOREIGN PATENT DOCUMENTS

| | | |
|---|---|---|
| 0223022 | 5/1987 | European Pat. Off. . |
| 6108820 | 5/1994 | Japan . |
| WO92/06768 | 4/1992 | WIPO . |
| WO93/18841 | 9/1993 | WIPO . |

*Primary Examiner*—Robert Spitzer
*Attorney, Agent, or Firm*—Browdy and Neimark

[57] ABSTRACT

A diesel particulate filter apparatus comprises filter structures bent in a wavy profile, formed in a tubular form, and comprising ceramic fiber laminate materials formed by randomly laminating a ceramic fiber and wire nets laminated on the ceramic fiber laminate materials. First rigid members and second rigid members are fitted in and on both end portions of the filter structures. Tubular clamping members for clamping the filter structures in the thickness-wise direction thereof are provided on the outer sides of the second rigid members. Woven fabrics may be interposed between nonwoven fabrics of the ceramic fiber and the wire nets constituting the filter structures. Filter members comprise ceramic fiber laminate materials formed by laminating a ceramic fiber, and glass layers covering the outer peripheral surfaces of the ceramic fiber laminate materials and having a low Young's modulus and a coefficient of linear thermal expansion substantially the same as that of the ceramic fiber, whereby breakage of the fiber laminate materials can be prevented while enabling forming thereof.

17 Claims, 10 Drawing Sheets

DIESEL PARTICULATE FILTER APPARATUS

BACKGROUND OF THE INVENTION

1. Field of the Invention

The present invention relates to a diesel particulate filter apparatus to be incorporated into an exhaust system for purification treatment of exhaust gas discharged from a diesel engine.

2. Description of the Prior Art

In general, a diesel engine generates particulates such as carbon, soot and HC because of heterogeneous combustion wherein fuel sprayed into air elevated in temperature through adiabatic compression is combusted.

A diesel particulate filter made of, e.g., cordierite as the material thereof is known as a conventional filter for collecting particulates such as carbon, soot and HC from exhaust gas discharged from a diesel engine. A filter made using as the material thereof an inorganic fiber instead of cordierite is also known. In a diesel particulate filter apparatus having a filter body made using an inorganic fiber, the filter body is produced by laminating an inorganic fiber material and locally weaving an inorganic fiber material into the resulting laminate material to effect felting thereof. The filter body made of the inorganic fiber material can be miniaturized as compared with a honeycomb filter made of cordierite because the former enables particulates in exhaust gas discharged from a diesel engine to be trapped in the inner part of the filter body as well as on the surface thereof.

As shown in FIGS. 1 and 2, a diesel particulate filter apparatus wherein a filter is disposed in an exhaust gas flow path to filter exhaust gas for collecting particulates in exhaust gas was developed. Since a shutoff plate 33 for regulation of the exhaust gas flow path is disposed on the downstream side of the filter 31 in a cylindrical form, the diesel particulate filter apparatus is constructed in such a way that exhaust gas introduced into the filter 31 from the upstream side thereof is passed across the filter provided along the sidewall of a cylinder to be flowed into an exhaust path 32. Under control with a controller 34, electricity is flowed through a heater provided on the filter 31 to incinerate particulates collected with the filter.

In the particulate filter, a ceramic fiber laminate 25 having ceramic fibers randomly laminated and integrated together in a felty or papery form, and sandwiched between metal nets 27 as a heater is used as a filter material 23. The filter material 23 is bent in a wavy profile for enlargement of the collection surface area thereof, and then formed in a cylindrical form as a whole to produce the filter 31. As shown in FIGS. 3 and 4, an upstream seal cap 37 and a downstream seal cap 38 are used for sealing both ends of the filter 31. Thus, the filter 31 is formed. The seal cap 37 is provided with an opening 39 for allowing passage therethrough of exhaust gas.

Sealing between the filter 31 and the seal caps 37 and 38 is carried out according to the following procedure. Prior to sealing, a sealant is cast into the respective recesses 36 and 29 of the seal caps 37 and 38. A mixture prepared by adding 1 part of waterglass (in the form of a mixture of 1 part of waterglass admixed with 1 part of water) to 1 part of a material comprising 80 wt. % of an alumina powder and 20 wt. % of an alumina staple fiber (1 to 30 mm) is used as the sealant. Before the sealant is dried, the end portions of the filter 31 are fitted into the recesses of the seal caps 37 and 38, followed by heating thereof up to 350° C. for solidification of the sealant.

Since the filter material 23 is elastic in the thickness-wise direction thereof and hence not necessarily uniformly settled in thickness because it is constructed in such a way that the ceramic fiber laminate is sandwiched between the wire nets 27. Further, the cross-sectional form of the filter 31 is wavy for enlargement of the collection surface area thereof. In sealing between the filter 31 and the seal caps 37 and 38, adhesion therebetween is sometimes unsatisfactory to cause leakage of exhaust gas though the former has the same wavy cross section as those of the latter. As a result, the diesel particulate filter apparatus involves a problem that particulates in exhaust Gas are discharged out of the apparatus without collection therewith of particulates.

On the other hand, Japanese Patent Laid-Open No. 108,820/1994 discloses a filter produced using a nonwoven fabric made of a ceramic fiber. End portions of the filter are put between and carried by metal sealing members, and supported by a case. In order to carry the end portions of the filter put between the metal sealing members, an areal pressure of about 10 Mpa is necessary. When the end portions of the filter are sandwiched between the sealing members under such a high areal pressure, the ceramic fiber constituting the nonwoven fabric is broken and the end portions of the filter come off.

Meanwhile, the applicant of the instant application developed a diesel particulate filter made of an inorganic filament, and previously filed a patent application directed thereto (Japanese Patent Application No. 114,131/1994). This diesel particulate filter is produced by horizontally irregularly orienting and laminating cut pieces of a heat-resistant inorganic filament cut to a predetermined length, needling the resulting laminate to effect vertical entanglement of the inorganic filament, superposing wire nets made of a heat-resistant metal on both the upper and lower surfaces of the resulting felty material, and fastening them from both surfaces thereof with a heat-resistant yarn. Herein, the above-mentioned inorganic filament is, for example, a fiber made of a material selected from among Si—Ti—C—O, Si—C—O, Si—N, SiO and metals, and having the surface thereof coated with at least one of SiC, Al and $Al_2O_3$.

When a diesel particulate filter apparatus for collection therewith of particulates such as carbon and smoke contained in exhaust gas is produced using the filter produced by laminating a heat-resistant ceramic fiber such as an SiC fiber or an Si—Ti—C—O fiber, however, pieces of the fiber material must be alternately woven into one another in the step of laminating the ceramic fiber to create a difficulty in forming the filter through laminating thereof because the ceramic fiber material is liable to break. Specifically, when a filter body is produced using the ceramic fiber, the ceramic fiber material constituting the filter body is brittle in itself and hence weak against vibrations and impacts to involve problems such as a fear of breakage and a high production cost. Further, the ceramic fiber such as an SiC fiber in particular has a high Young's modulus of 430 GPa to be liable to break. In the step of producing the filter body by felting the ceramic fiber and in the step of assembling the ceramic fiber material-based diesel particulate filter apparatus, therefore, the ceramic fiber is broken into fine pieces and separated during bending thereof for forming the filter as well as assembly of the apparatus to create a difficulty in weaving pieces of the ceramic fiber material into one another for forming the filter body, and the separated fine pieces of the fiber are scattered to present a problem of deterioration of working environment.

SUMMARY OF THE INVENTION

An object of the present invention is to solve the foregoing problems of the prior art, i.e., to provide a diesel particulate filter apparatus wherein the end portions of the filters thereof are surely sealed to prevent exhaust gas from being discharged without filtering thereof, or woven fabrics made of a ceramic fiber are interposed between nonwoven fabrics made of a ceramic fiber and wire nets for mitigation of an excessive local areal pressure applied by the clamping action of metal sealing members to prevent breakage of the fabrics.

Another object of the present invention is to provide a diesel particulate filter apparatus to be incorporated into an exhaust system for purification treatment of exhaust gas discharged from a diesel engine, wherein the filter bodies thereof are made of a ceramic fiber for sure collection therewith of particulates such as carbon, soot and HC contained in exhaust gas; and wherein ceramic fiber materials are coated with a glass material low in Young's modulus to increase the bending strength of the ceramic fiber materials and prevent the ceramic fiber materials from being broken and scattered during the forming step with an improved workability for improvements in respect of problems such as breakage thereof in the step of producing the filter bodies from the ceramic fiber, in the step of assembling the apparatus, etc. and deterioration thereof during use of the apparatus.

In a diesel particulate filter apparatus according to present invention, wire nets as a heater are disposed in contact with ceramic fiber laminate materials formed by randomly laminating and integrating a ceramic fiber in the form of a felt or a plate, the resulting composite materials are bent in a wavy (ribbed) profile having recesses and protrusions and formed into tubular filter structures, and first rigid members formed in the form of a tube fitting in the wavy profile are disposed on the inner sides of both end portions of the filter structures, second rigid members formed in the form of a tube fitting on the wavy profile are disposed on the outer sides of both end portions of the filter structures, and clamping members for clamping the filter structures in the thickness-wise direction thereof are provided on the outer sides of the second rigid members.

Since both end portions of the filter structures are therefore substantially uniform in filter thickness, adhesion between the tubular filter structures and such seal caps is increased to ensure sealing of the former, whereby exhaust gas is not leaked from both end portions of the filter structures and not discharged out of the filter structures without filtering thereof. Further, the filter structures are large in contact area with exhaust gas due to the wavy profiles thereof to enable a large amount of exhaust gas to be filtered even when the filter structures are small in size.

Another diesel particulate filter apparatus according to the present invention comprises filter structures wherein wire nets made of a heat-resistant metal are superposed on both surfaces of nonwoven fabrics made of a ceramic fiber, and woven fabrics made of a ceramic fiber are interposed between the wire nets and the nonwoven fabrics. When electricity is flowed through the wire nets to heat the filter structures, particulates collected with the nonwoven fabrics are incinerated.

Since this diesel particulate filter apparatus has the foregoing constitution, clamping stress on the nonwoven fabrics due to the mutual clamping action of metal sealing members is mitigated by the flexible woven fabrics made of the ceramic fiber to prevent the nonwoven fabrics made of the ceramic fiber from being broken, whereby the sealability and durability of the end portions of the filter structures can be improved.

Further, use may be made of filter members comprising ceramic fiber laminate materials formed by laminating a ceramic fiber, and glass layers covering the outer peripheral surfaces of the ceramic fiber laminate materials and made of a glass material low in Young's modulus and substantially the same in coefficient of linear thermal expansion as the ceramic fiber.

The above-mentioned ceramic fiber may be an SiC ceramic fiber. The above-mentioned glass layers may be made of an oxynitride glass material such as Mg—Al—Si—O—N, Y—Al—Si—O—N or Li—Al—Si—O—N. Alternatively, the above-mentioned ceramic fiber may be used in the form of a multiple twist yarn made of small-diameter SiC ceramic fibers twisted and drawn in the form of a yarn.

In order to cover the ceramic fiber laminate materials with the glass layers, a sol-gel slurry of an oxide glass is prepared, with which the ceramic fiber laminate materials are then coated, followed by heating in $NH_3$, whereby nitriding of the oxide glass can be effected.

Alternatively, in order to cover the ceramic fiber laminate materials with the glass layers, predetermined amounts of $Li_2O$, $Al_2O_3$, $Al_2OF_3$, $SiO_2$ and $Si_3N_4$ may be blended with one another and pulverized, followed by preparation of a sol-gel slurry thereof, with which the ceramic fiber laminate materials are coated, followed by heating in $N_2$, whereby such covering can be attained.

Since this diesel particulate filter apparatus has the foregoing constitution, the glass layers make the above-mentioned fiber laminate materials unliable to be broken as opposed to the liability of the ceramic fiber to breakage during forming thereof for production of the filter members from the ceramic fiber alone, whereby the ceramic fiber can be prevented from being broken and scattered from the above-mentioned fiber laminate materials to improve the workability in production steps such as a bending step and a weaving-in step. Further, since the ceramic fiber laminate materials are made of the SiC ceramic fiber, the filter members are excellent in heat resistance to increase the strength thereof under heat, and can be improved in the efficiency of collection of particulates such as black smoke, carbon and smoke contained in exhaust gas during passage of exhaust gas across the filter members. Since the glass layers are substantially the same in coefficient of linear thermal expansion as the SiC ceramic fiber laminate materials, peeling off of the glass layers from the ceramic fiber laminate materials due to a difference therebetween in thermal expansion does not occur, whereby the durability of the filter members excellent in heat resistance can be increased.

When consideration is given to the bent state of the SiC fiber at breakage, the strength of the SiC fiber is 3.3 GPa in terms of tensile strength and the elongation thereof at breakage is 1.7%. The following examination is made of what size of a round formed by bending a SiC fiber material brings about breakage thereof. When the radius of the round of the bent SiC fiber material is R and the diameter d of the SiC fiber material is 0.01 mm, the elongation of the SiC fiber material is as follows.

$[2\pi(R+d)-2\pi R]/2\pi(R+d)$ $0.017=[2\pi(R+d)-2\pi R]/2\pi(R+d)$ $d/(R+d)=0.017$ $0/017R=0.983d$ $R=0.57$ (mm)

When the curvature radius of the bent SiC fiber is about 0.57, breakage of the SiC fiber occurs. When the SiC fiber is broken or snapped, the SiC fiber cannot be laminated to result in a failure in weaving-in forming thereof.

Accordingly, in order to prevent a ceramic fiber from being broken, the outer peripheral surface of the ceramic fiber is coated with a glass material low in Young's modulus. Further, when the ceramic fiber is of ultrafine denier and twisted into a yarn, R in bending can be smaller to improve the forming resistance thereof. When the ceramic fiber in the form of a twist yarn is coated with the glass material, therefore, the effect of preventing the ceramic fiber from being broken is improved.

For example, since the Young's modulus of soda-lime glass is 73 GPa and the tensile strength of a fiber thereof is 4,000 MPa, coating of the outer peripheral surface of the SiC fiber with a soda-lime glass material can improve the strength of the fiber and can make the fiber resistant to bending up to 0.17 mm in curvature radius R of a round formed by bending the fiber.

In the case of coating the fiber with glass, however, the temperature is elevated. When the temperature is elevated, peeling off of the glass from the fiber occurs while involving a problem with the heat resistance of the glass if both are different from each other in coefficient of linear thermal expansion. In view of this, the SiC fiber and the glass as mentioned above which are substantially the same in coefficient of linear thermal expansion are selected for the filter members according to the present invention.

Since the filter members according to the present invention have the foregoing constitution, the glass material low in Young's modulus and substantially the same in coefficient of linear thermal expansion as the ceramic fiber can be selected for the aforementioned glass layers to decrease a difference therebetween in thermal expansion through expansion and shrinkage with heat, whereby the coating glass layers can be prevented from being peeled off from the joint surfaces thereof with the ceramic fiber laminate materials and the tensile strength of the ceramic fiber laminate materials can be increased with the aid of the glass layers to enable weaving-in forming of the fiber laminate materials. Thus, filter bodies having a desired shape can be formed from the fiber laminate materials. Specifically, the glass layers can cover the brittleness of the ceramic of the ceramic fiber laminate materials, which therefore become unliable to breakage to prevent the ceramic fiber from being broken, separated and scattered from the fiber laminate materials, whereby the yield either in forming the fiber into, for example, a felt or in bending the felt in a ribbed profile and forming the filter bodies therefrom can be improved while the workability in forming the filters can also be improved.

DETAILED DESCRIPTION OF THE EMBODIMENTS

Examples of the diesel particulate filter apparatus according to the present invention will now be described while referring to the accompanying drawings.

Figure 5:
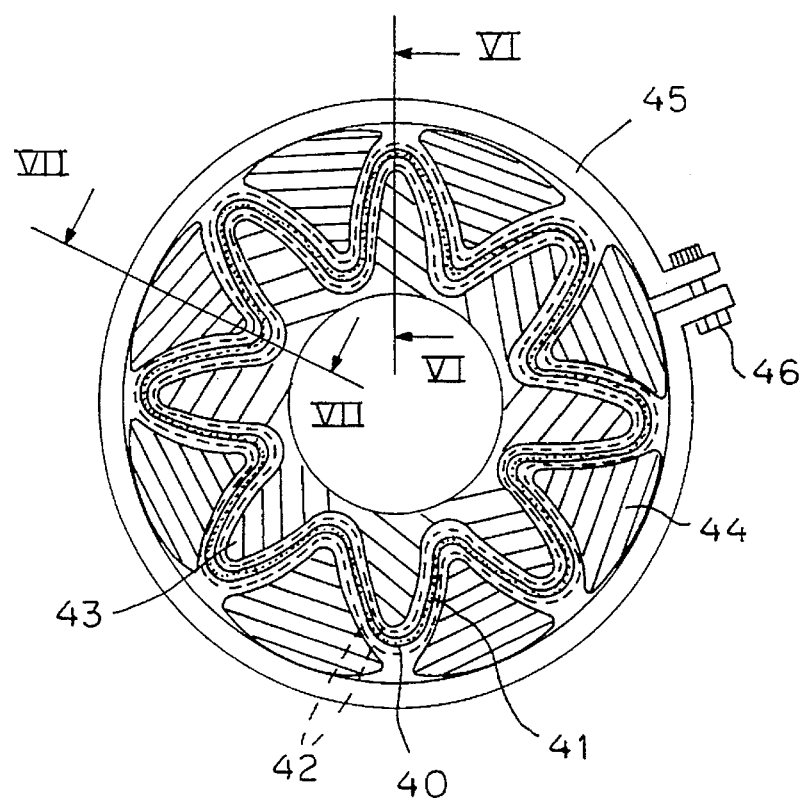
FIG. 5 is a cross-sectional view of an end portion of an example of a particulate filter according to the present invention.

In the case of a diesel particulate filter of FIG. 5, a ceramic fiber laminate member 41 is put between and carried by wire nets 42 as a heater, then bent in a wavy profile, and then formed into a cylindrical filter structure 40. Cylindrical inner clamping members 43 having protrusions and recesses engaged with the respective wavy recesses and protrusions of the filter structure 40 are provided on the inner side of the filter structure 40. Outer clamping members 44 having protrusions engaged with the respective wavy recesses of the filter structure 40 are provided on the outer side of the filter structure 40. Metal clamping bands 45 are provided around the outer clamping members 44. The filter structure 40 sandwiched between the inner clamping members 43 and the outer clamping members 44 is clamped in the thickness-wise direction of the filter by fastening the clamping bands 45 tight with fastening screws 46.

Figure 6:
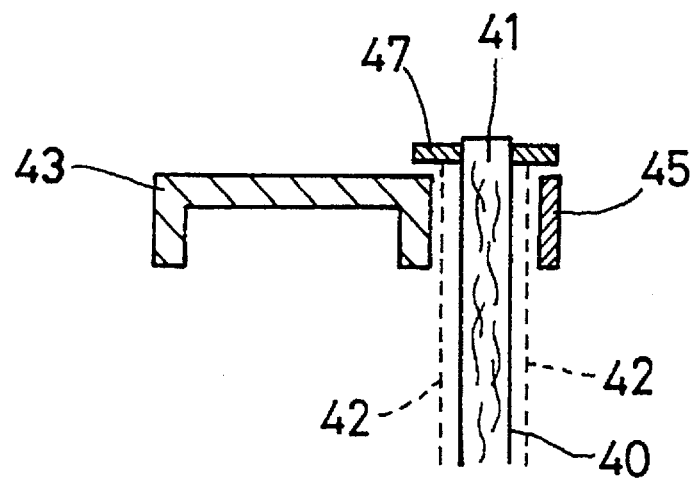
FIG. 6 is an axial cross-sectional view of the cylinder, taken along the plane of line A—A of FIG. 5.
Figure 7:
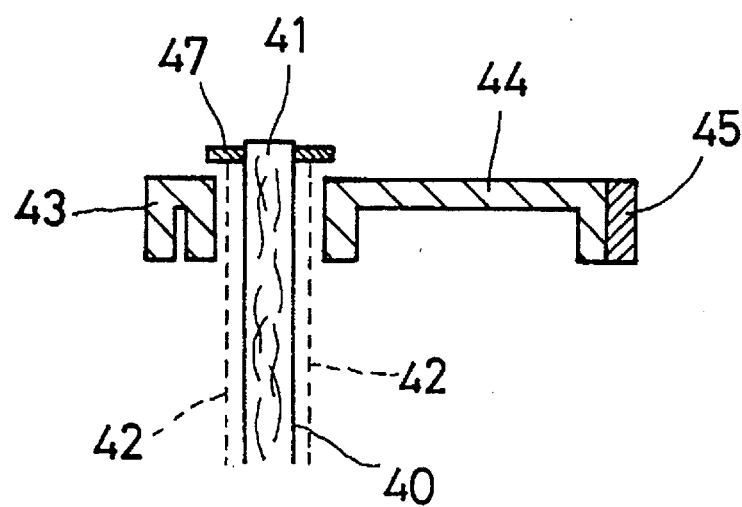
FIG. 7 is an axial cross-sectional view of the cylinder, taken along the plane of line B—B of FIG. 5.

FIG. 6 shows a portion corresponding to the cross section of a wavy protrusion of the filter structure 40. Here, with no outer clamping member 44, the filter structure 40 constituted of the ceramic fiber laminate member 41 and the wire nets 42 is sandwiched and clamped between an inner clamping member 43 and a clamping band 45 either directly or with a space in contact with a wire net 42. FIG. 7 shows a portion corresponding to the cross section of a wavy recess of the filter structure 40. Here, the filter structure 40 is sandwiched between an inner clamping members 43 and an outer clamping member 44, and clamped therewith from the inside and outside of the structure with the aid of the clamping band 45.

In FIGS. 6 and 7, the end portion of the filter structure 40 protrudes beyond the ends of the outer clamping member 44 and the clamping band 45, and a fastener 47 such as a stapler is attached to the protrusion. This prevents the clamped filter structure 40 from slipping off. In FIGS. 5 to 7, the filter structure 40 in a state before clamping thereof is shown for intelligibly explaining the arrangement of all parts of the cross section of the filter structure 40. In an actual clamped state, therefore, the filter structure 40 is in tighter contact with the inner clamping members 43 and the outer clamping members 44 in tigher contact with the clamping bands 45.

The inner clamping members 43 and the outer clamping members 44 are produced by working a rigid material such as a metal, a rigid ceramic or a porous substance in conformity with the wavy profile of the filter structure 40. Where a metal is used as the material, those members having the surfaces thereof further covered with insulating layers are used. This is because an electric current is prevented from flowing through the inner clamping members 43 and the outer clamping members 44 when electricity is flowed through the wire nets 42 as the heater for incineration of particulates collected with the filter. Further, the inner clamping members 43 and the outer clamping members 44 are formed in a hollow gate-like profile as shown in FIGS. 6 and 7. This is because the uncalled-for consumption of electric power for heating the heater can be lowered by decreasing the heat capacities of these members as much as possible since these members are heated simultaneously with heating of the wire nets 42 as the heater.

The clamping bands 45 are made of a heat-resistant metal such as SUS or a low thermal expansion coefficient metal such as Incolog 903 in order to maintain the filter structure 40 in a clamped state while preventing the filter structure 40 from being deformed at a high temperature during heating thereof. Accordingly, the coefficient of linear thermal expansion of the metal constituting the clamping bands 45 is desired to be equal to or lower than that of a material constituting the inner clamping members 43 and the outer clamping members 44.

Figure 8:
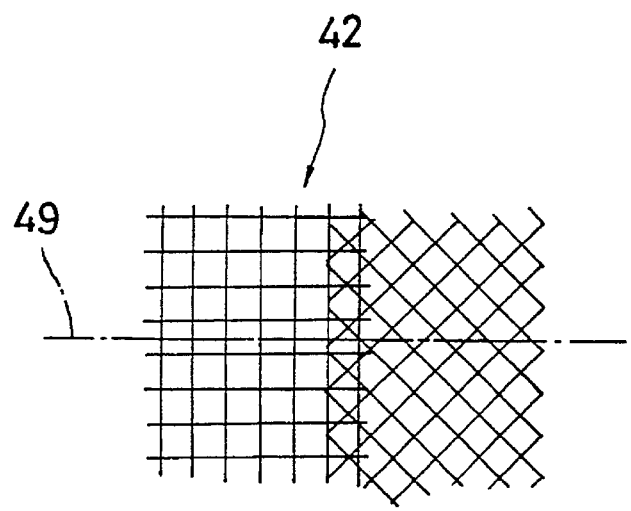
FIG. 8 is a top plan view of a metal wire net in an end portion of an example of a filter according to the present invention.

As shown in FIG. 8, the wire nets 42 as the heater are formed into a substantially squarely latticed network structure of metal wires disposed in directions parallel and perpendicular to the axial direction 49 of the cylindrical filter structure 40 in order to uniformly heat the filter as a whole with the heater. Wire nets 42 for the end portions of the filter structure 40 are formed into a network structure of metal wires disposed in directions oblique to the axial direction 49 of the cylindrical filter structure 40. The foregoing configuration of the wire nets 42 prevents spaces from being formed between the ceramic fiber laminate material 41 and the wire nets 42 uniformly pressed down as a whole by virtue of flexible absorption of the clamping force of the latter when the wire nets 42 are clamped down on the end portions of the filter structure 40.

If the wire nets 42 are disposed in directions parallel and perpendicular to the axial direction of the cylindrical filter structure 40 to form a substantially squarely latticed network structure, local deformation such as expansion and doubling of the lattice of the wire nets 42 occurs when the end portions of the filter structure 40 are clamped. The structure of the wire nets disposed in directions oblique to the axial direction of the cylindrical filter structure 40 may be used not only on the end portions of the filter structure 40 but also on the whole of the filter.

Figure 1:
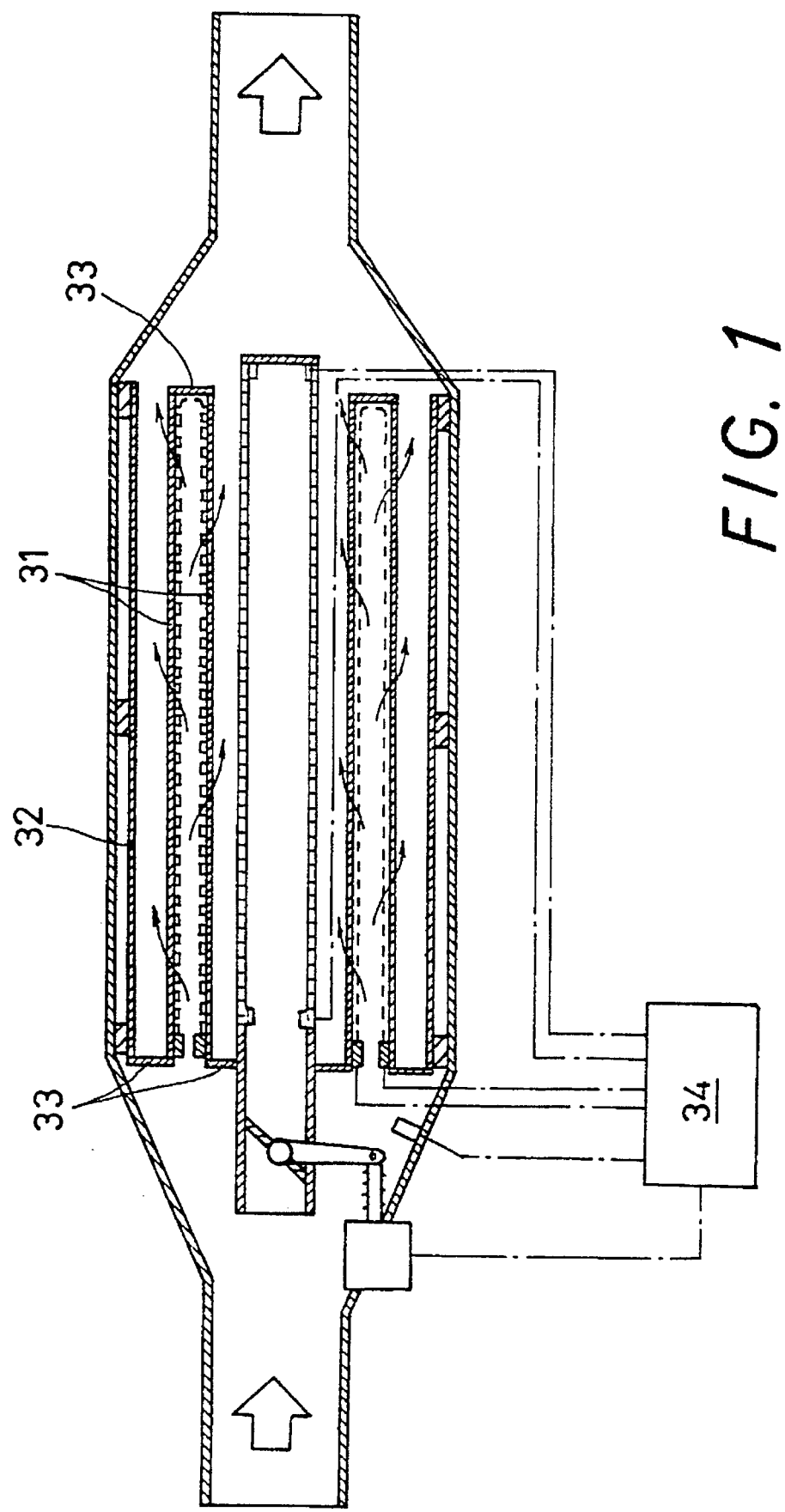
FIG. 1 is a cross-sectional view of a particulate filter provided in an exhaust gas flow path.
Figure 2:
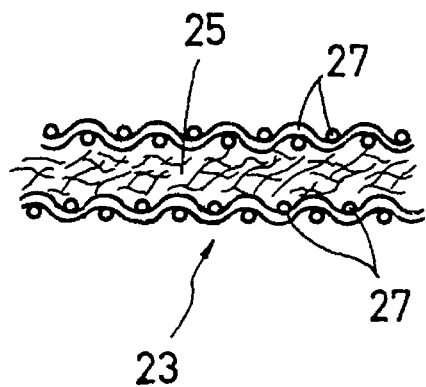
FIG. 2 is a cross-sectional view of the filter element of the particulate filter of FIG. 1.
Figure 3:
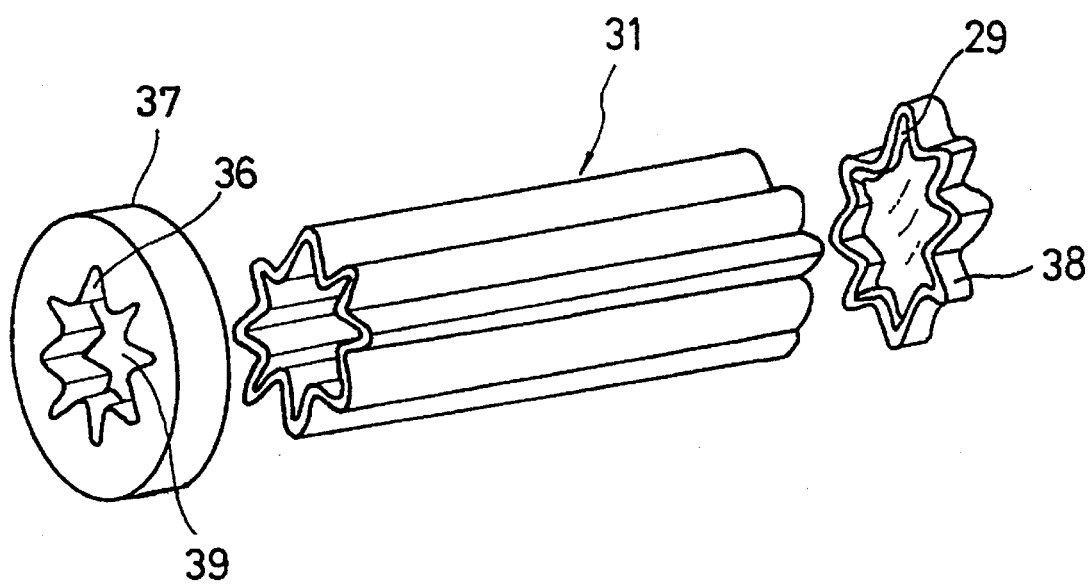
FIG. 3 is an exploded perspective view showing a sealing structure of a filter and filter caps.
Figure 4:
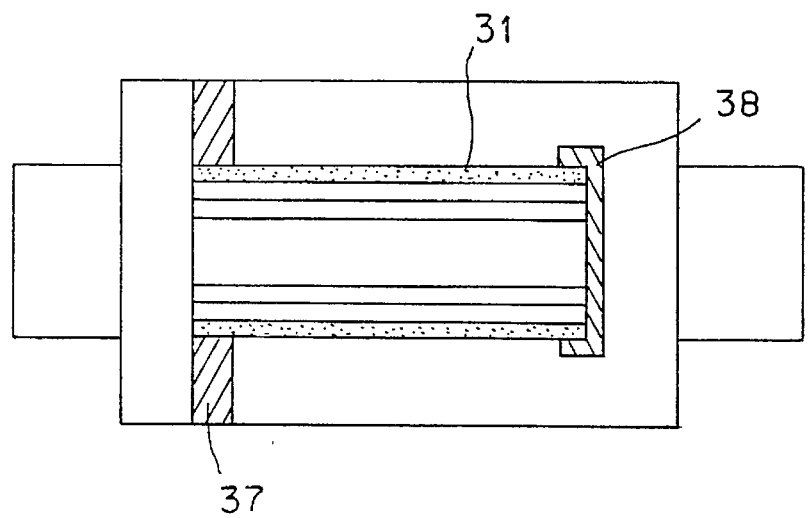
FIG. 4 is an illustration for explaining a sealing structure of a filter and filter caps.
Figure 9:
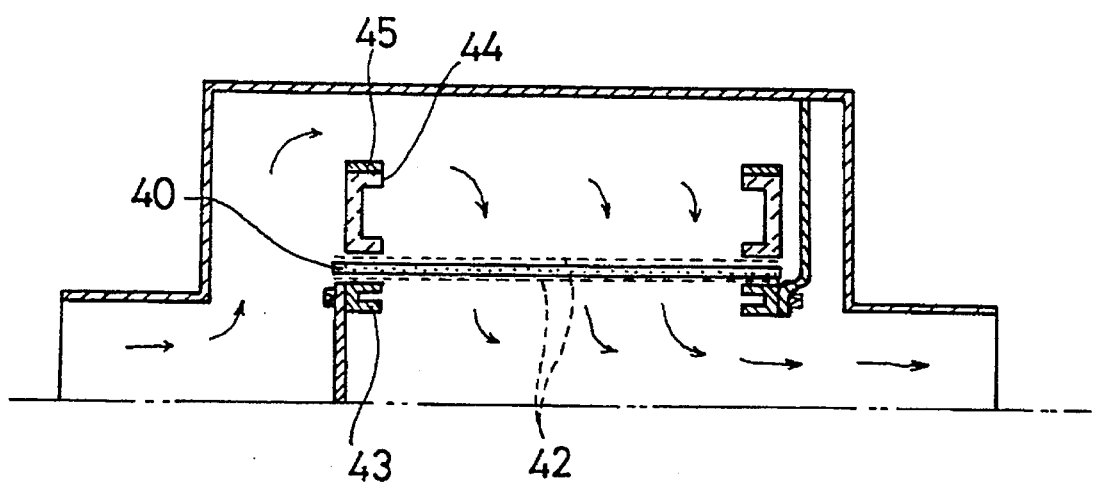
FIG. 9 is a cross-sectional view of a filter according to the present invention.
Figure 10:
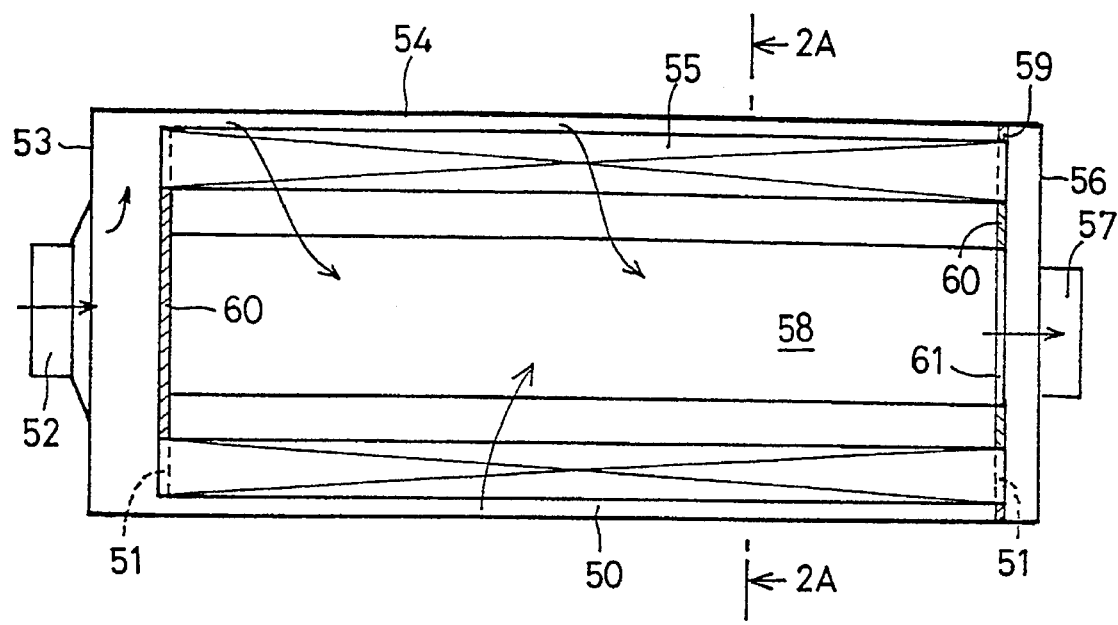
FIG. 10 is an illustration showing another example of a diesel particulate filter according to the present invention.

After the end portions of the filter structure 40 are clamped with the inner clamping members 43, the outer clamping members 44 and the clamping bands 45, both ends thereof are sealed using an upstream seal cap 37 and a downstream seal cap 38 as shown in FIG. 3. The upstream cap 37 has recesses 36, while the downstream seal cap 38 has recesses 29. FIG. 9 shows disposition of the filter structure 40 in this diesel particulate filter.

Another example of a diesel particulate filter according to the present invention will now be described while referring to FIGS. 10 to 14. In this diesel particulate filter, a cylindrical filter structure 55 is contained in a cylindrical case 54. An inlet pipe 52 is fitted into and connected with the central opening of the left end plate 53 of the case 54, while an outlet pipe 57 is fitted into and connected with the central opening of the right end plate 56 of the case 54. The inlet pipe 52 is connected to an engine via an exhaust pipe there-between, while the outlet pipe 57 is connected to a muffler via an exhaust pipe there-between. One end portion of the filter structure 55 has the hollow portion 58 thereof closed with a discoid sealing member 60, while the other end portion of the filter structure 55 is closed with an annular sealing member 51. The peripheral rim 59 of the sealing member 51 is joined with the inner peripheral wall of the case 54. An outside space portion 50 between the case 54 and the filter structure 55 communicates with the inlet pipe 52, while the hollow portion 58 of the filter structure 55 communicates with the outlet pipe 57. Exhaust gas is introduced into the space portion 50 of the case 54 from the inlet pipe 52, and then passed across the filter structure 55 in the diametral inward direction thereof while collecting particulates with the filter structure. Purified exhaust gas is discharged from the hollow portion 58 into the outlet pipe 57.

Figure 11:
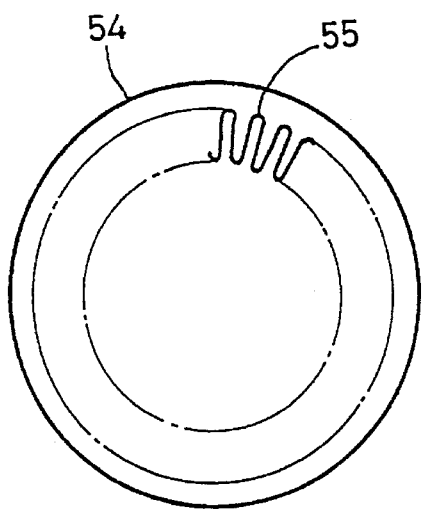
FIG. 11 is a front cross-sectional view of the filter of FIG. 10.

As shown in FIG. 11, the cross section of the filter structure 55 is curved in the diametral outward direction alternate with diametral inward direction thereof in a wavy profile to enlarge the area of the filter structure for passage of exhaust gas.

Figure 12:
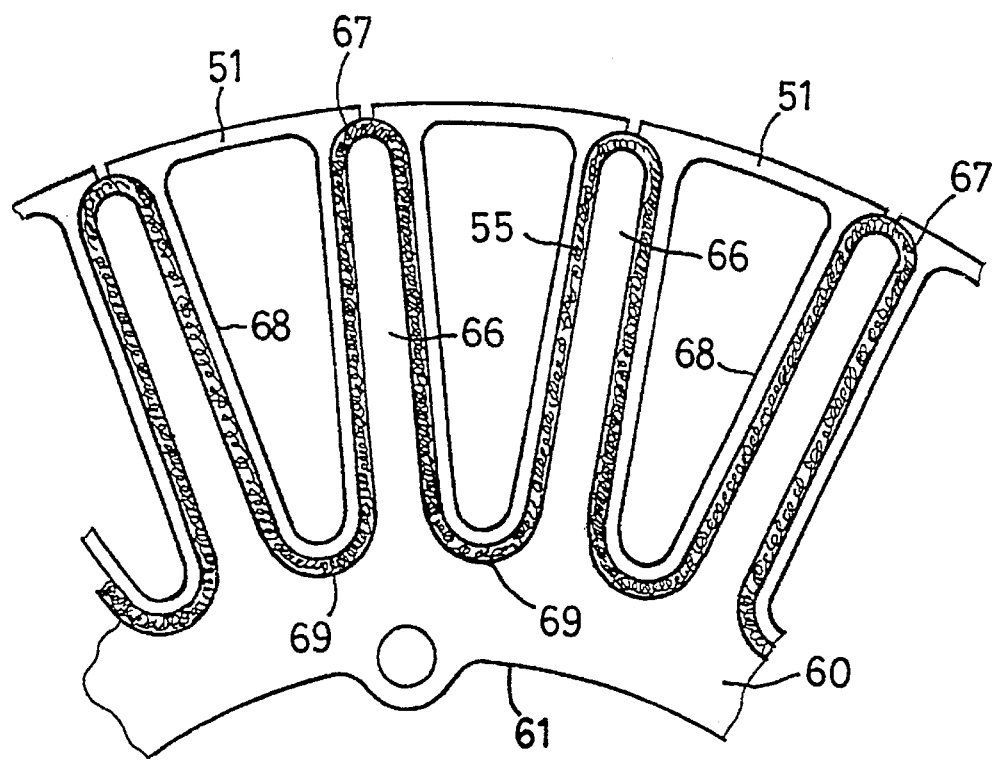
FIG. 12 is a partly enlarged cross-sectional view of the filter of FIG. 10.
Figure 13:
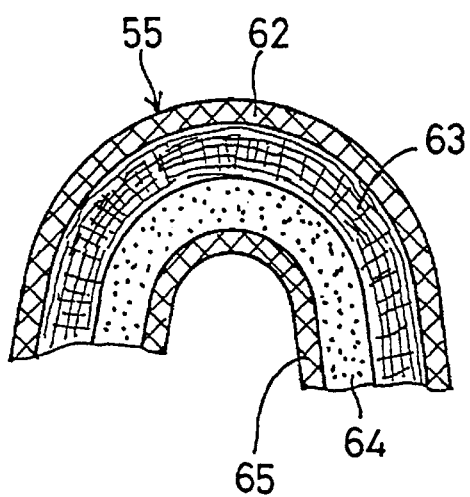
FIG. 13 is a partly enlarged cross-sectional view of the filter of FIG. 10.

As shown in FIG. 13, the filter structure 55 is a laminate comprising a nonwoven fabric 64 formed by randomly laminating a ceramic fiber containing about 70% of alumina and about 30% of $SiO_2$ or an Si—Ti—C—O ceramic fiber, a woven fabric made of a ceramic fiber and superposed on a whole surface of the nonwoven fabric 64, a wire net 62 made of a heat-resistant metal such as stainless steel and superposed on the obverse surface of the woven fabric 63, and a wire net 65 superposed on the back surface of the nonwoven fabric 64. As shown in FIG. 12, this diesel particulate filter comprises the filter structure 55 bent in a wavy profile and formed in the form of a cylinder which is put between and carried by sealing members 51 and 60 having respective predetermined thicknesses and pressed on the inner and outer surfaces of both end portions of the cylinder.

In order to support the filter structure 55 in the case 54 while maintaining the profile of the former, one end portion of the filter structure 55 is put between and carried by the outer sealing member 51 and the inner sealing member 60 pressed on the obverse and back surfaces of that one end portion, as shown in FIG. 12. The discoid sealing member 60 has a number of protruding leaves 66 projected in the diametral outward direction thereof. The protruding leaves 66 are fitted into grooves, or curved portions 67, of the back surface of the filter structure 55 which are formed in the axial direction thereof. On the other hand, the sealing members 51 are a number of frame bodies each having a lank and substantially triangular opening 68, which are fitted into grooves, or curved portions 69, of the obverse surface of the filter structure 55 which are formed in the axial direction thereof. The sealing members 51 are a number of segments having an outer rim in the form of a circular arc. These segments are fixed in an annular form with a metal band (not shown in the figure). On the other hand, the other end portion of the filter structure 55 is put between and carried by sealing members 51 and sealing member 60 respectively pressed on the obverse and back surfaces of that other end portion in substantially the same manner as described above. The peripheral rims 59 of the sealing members 51 are connected to the inner peripheral wall of the case 54. The sealing member 60 has a round opening formed in a central portion thereof.

Figure 14:
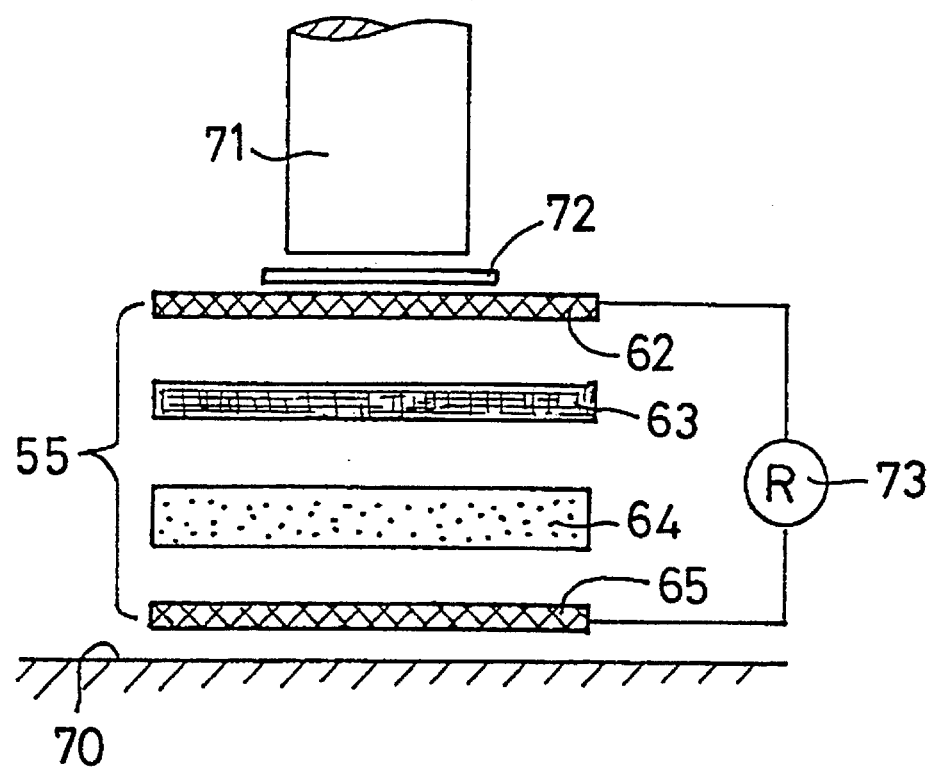
FIG. 14 is an illustration showing a durability test for the filter of FIG. 10.

The material constituted of the two wire nets 62 and 65, and the nonwoven fabric 64 and the woven fabric 63 both sandwiched between the two wire nets 62 and 65 in this diesel particulate filter was subjected to a strength test. The nonwoven fabric 64 was made of an Si—Ti—C—O ceramic fiber and had a basis weight of about 300 g/cm². The woven fabric 63 was made of a 70% $Al_2O_3$-30% $SiO_2$ ceramic fiber of 12 µm in diameter, and had a thickness of about 1 mm. As a result, none of the nonwoven fabric 64 and the woven fabric 63 constituting the filter structure 55 were broken. Specifically, as shown in FIG. 14, the wire net 65, the nonwoven fabric 64, the woven fabric 63 and the wire net 62 were piled up in this order on a base plate 70, and an insulating sheet 72 made of a synthetic resin or the like was then placed on the wire net 62. A push bar 71 of 35 mm in diameter was pressed under a pressure of 10 Mpa against the filter structure 55, and the electric resistance between the wire net 62 and the wire net 65 was measured with a resistance meter 73 to find an electric resistance of about 1MΩbetween the wire nets 62 and 65.

When a woven fabric made of an 80% $Al_2O_3$-20% $SiO_2$ ceramic fiber of 12 µm in diameter and having a thickness of about 1 mm as well as a woven fabric made of a 60% $Al_2O_3$-40% $SiO_2$ ceramic fiber of 12 µm in diameter and having a thickness of about 1 mm was used as the woven fabric 63, substantially the same results were obtained.

A comparative filter structure 55 was produced by superposing each of woven fabrics A to D each made of a ceramic fiber as shown in Table 1 and having a predetermined thickness as shown in Table 1 instead of the woven fabric 63 on the nonwoven fabric 64. The same tests as described above were carried out to find out that the nonwoven fabric 64 as well as the woven fabrics A to C was broken, and that the wire nets 62 and 65 were in electrical contact with each other.

surface of the nonwoven fabric 64 made of the ceramic fiber, the end portions of the filter structure 55, even when put between and carried by the metal sealing members 51 and 60, are not broken by a clamping force while involving no fear of mutual electric contact of the wire nets 62 and 65 on the two surfaces of the filter structure 55. In the filter structure 55 according to the present invention, it is believed that excessive local clamping stress can be mitigated by virtue of the flexibility and thickness of the ceramic fiber constituting the woven fabric 63 to prevent the nonwoven fabric from being broken.

A further example of the diesel particulate filter apparatus according to the present invention will now be described while referring to FIGS. 15 to This example of the diesel particulate filter apparatus is constructed in such a way as to be contained in a case 3, for example, incorporated into an exhaust pipe of a diesel engine. When exhaust gas discharged from the diesel engine is flowed in the direction of Arrows G across filter bodies, particulates such as black smoke, carbon, soot and HC contained in exhaust gas are collected with the filter bodies through attachment and deposition thereof between ceramic fibers, while the collected particulates are heated and incinerated to reproduce the filter bodies. Reproduction of the filter bodies can be attained by flowing electricity through wire nets to heat the filter bodies and incinerate the particulates collected by the filter bodies. The filter bodies are constituted of a principal filter 1 and a subfilter 2 as will be described later, the configurations of which may be constructed in the form of a tube such as a cylinder, a flat plate, waves, ribs, or the like.

Figure 17:
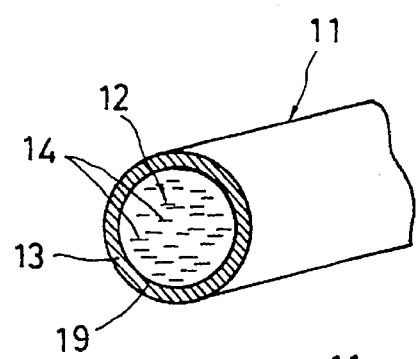
FIG. 17 is a partly cross-sectional perspective view showing part of a monofilament as an example of the fiber material.

As shown in FIG. 17, filter members in the diesel particulate filter apparatus of the present invention can each be produced by laminating a ceramic fiber 14 in the form of a monofilament, covering the resulting ceramic fiber laminate material 12 with a glass layer 13 to form a fiber material 11, laminating a number of pieces of the fiber material 11 into a felty form, and weaving the ceramic fiber 14 into the resulting felty material to form a felt. The fiber material 11 constituting a filter member for collecting particulates contained in exhaust gas from a diesel engine is constituted of the ceramic fiber laminate material 12 formed as a nonwoven fabric by laminating the ceramic fiber 14 in the form of a monofilament, and a glass layer 13 covering the outer peripheral surface 19 of the ceramic fiber laminate material 12 and made of a glass material low in Young's modulus and substantially the same in coefficient of linear thermal expansion as the ceramic fiber 14. In the fiber material 11, for

TABLE 1

| Items | Composition of Fiber of Woven Fabric | Thickness | Resistance after Application of Areal Pressure | Rating |
|---|---|---|---|---|
| Present Invention | 70% $Al_2O_3$—30% $SiO_2$ | 1 mm | 1 MΩ | o |
| A | 70% $Al_2O_3$—30% $SiO_2$ | 0.6 mm | 0 Ω | x |
| B | 99% $Al_2O_3$ | 1 mm | 0 Ω | x |
| C | 99% $SiO_2$ | 1 mm | 0 Ω | x |
| Present Invention | Si—Ti—C—O | 0.6 mm | 24 KΩ | o |
| D | Si—Ti—C—O | 0.3 mm | 0 Ω | x |

In the case of the woven fabric D, the fiber of the woven fabric D was not broken, but partial slippage of points of intersection in the texture thereof occurred with breakage of the nonwven fabric 64 in slipped areas thereof.

Since the filter structure 55 according to the present invention comprises the woven fabric 63 superposed on a example, the ceramic fiber laminate material 12 may be 8 µm in diameter and the glass layer may be 2 µm in thickness.

Figure 18:
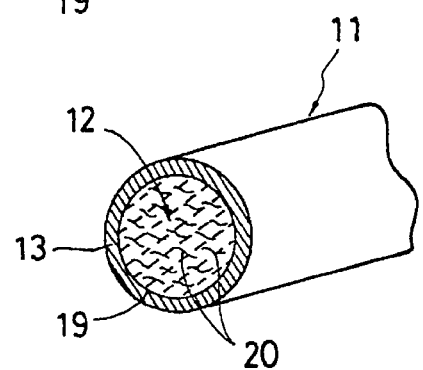
FIG. 18 is a partly cross-sectional perspective view showing part of a multiple twist yarn as another example of the fiber material.
Figure 19:
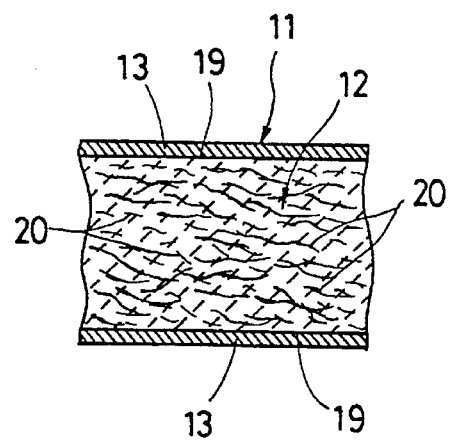
FIG. 19 is a cross-sectional view showing part of the fiber material made of the multiple twist yarn of FIG. 18.

As shown in FIGS. 18 and 19, the filter members may each alternatively be constituted of a ceramic fiber laminate material 12 made of a multiple twist yarn 20 of ultrafine denier ceramic fibers 14 twisted and drawn in the form of a yarn, and a glass layer 13 covering the outer peripheral surface 19 of the ceramic fiber laminate material 12 and made of a glass material low in Young's modulus and substantially the same in coefficient of linear thermal expansion as the ceramic fibers 14. When the ceramic fibers 14 are twisted into the multiple twist yarn 20, the radius (R) in bending of the latter can be further decreased to improve the forming resistance thereof. Additional coating of the multiple twist yarn with glass further improves the effect of preventing the former from being broken.

The ceramic fiber 14 may be in the form of a fiber of an SiC ceramic excellent in heat resistance. Examples of the SiC ceramic constituting the ceramic fiber 14 include Si—C—O, Si—Ti—C—O, and Si—C. The ceramic fiber 14 may contain alumina ($Al_2O_3$) or zirconia ($ZrO_2$) in addition to the SiC ceramic. On the other hand, the glass layer 13 is made of an oxynitride glass material having an excellent heat resistance, a low Young's modulus and substantially the same coefficient of linear thermal expansion as that of the ceramic fiber 14, examples of which material include Mg—Al—Si—O—N, Y—Al—Si—O—N, and Li—Al—Si—O—N.

Next, the filter members can each be produced according to the following procedure. In forming the fiber material 11, the ceramic fiber 14 in the form of a monofilament (or the multiple twist yarn 20) is formed into the ceramic fiber laminate material 12, while a sol-gel slurry of an oxide glass is prepared, applied on the ceramic fiber laminate material 12, and heated in $NH_3$ to nitride the oxide glass to thereby cover the ceramic fiber laminate material 12 with the glass layer 13. In forming the ceramic fiber laminate material 12 from the ceramic fiber 14, the ceramic fiber 14 in the form of a nonwoven fabric is formed into a bundle, which is then simultaneously twisted and drawn out to form the ceramic fiber laminate material 12 in the form of a string. In subsequently coating the stringy ceramic fiber laminate material 12 with the oxide glass, the ceramic fiber laminate material 12 is immersed in and passed through the sol-gel slurry of the oxide glass. Thus, the outer peripheral surface 19 of the ceramic fiber laminate material 12 is coated with the slurry. The resulting coated ceramic fiber laminate material is passed through a heating oven filled with $NH_3$ to nitride the slurry, whereby the glass layer 13 is formed on the outer peripheral surface 19 of the ceramic fiber laminate material 12 to form the fiber material 11. In producing a filter body from the fiber material 11, the fiber material 11 is laminated, while the fiber material 11 is woven into the resulting laminate to form a felty filter, which is then formed into a filter member in a predetermined shape such as bellows or a cylinder.

When the glass layer 13 is to be made of Mg—Al—Si—O—N glass, the oxide glass blending proportion may be such that 15% of MgO is blended with 37% of $Al_2O_3$, 28% of $SiO_2$ and 20% of $Si_3N_4$ to prepare a slurry. When use is alternatively to be made of Y—Al—Si—O—N glass, the oxide glass blending proportion may be such as to comprise 10% Al, 15% Y, 15% Si, 40% O and 6% N for preparation of a slurry. Oxynitride glass materials such as Mg—Al—Si—O—N and Y—Al—Si—O—N have an excellent heat resistance and a melting point of at least 1,500° C. to secure a sufficient strength at 1,000° C. Furthermore, they have a coefficient of linear thermal expansion substantially the same as that of the ceramic fiber 14.

Specifically, the coefficient of linear thermal expansion $\alpha$ of Mg—Al—Si—O—N glass, which is represented by the formula: $\alpha=4.7-5.7\times10^{-6}/°$ C, can be lowered to $\alpha=4.1-4.7\times10^{-6}/°$ C, when the N content thereof is increased, to approach to the coefficient of linear thermal expansion of the SiC ceramic fiber. On the other hand, Y—Al—Si—O—N glass has a coefficient of linear thermal expansion $\alpha=4\times10^{-6}/°$ C when the N content thereof is 6%.

According to an alternative process of forming the fiber material 11, a glass layer 13 wherein use is made of Li—Al—Si—O—N glass can be formed on the ceramic fiber laminate material 12 made of the SiC ceramic fiber 14 (or the multiple twist yarn 20 thereof). The Li—Al—Si—O—N glass material has an excellent heat resistance and a melting point of at least 1,500° C. to secure a sufficient strength at 1,000° C. In this example, the starting material blending proportion may be such that 6% of $Li_2O$ is blended with 24% of $Al_2O_3$, 2% of $AlF_3$, 48% of $SiO_2$ and 20% of $Si_3N_4$ to prepare a slurry. The Li—Al—Si—O—N glass has a coefficient of linear thermal expansion $\alpha$ of $3.2\times10^{-6}/°$ C. In this example, the ceramic fiber laminate material 12 is formed from the SiC ceramic fiber 14, while $Li_2O$, $Al_2O_3$, $AlF_3$, $SiO_2$ and $Si_3N_4$ are mixed together at the above-mentioned blending proportion, pulverized, and formed into a sol-gel slurry thereof, with which the ceramic fiber laminate material 12 is coated to form the coated ceramic fiber laminate material, which is then heated in $N_2$ at a thousand and a few hundreds of centigrades to cover the ceramic fiber laminate material 12 with the glass layer 13, whereby the fiber material 11 can be formed. The fiber material 11 can be formed into a filter body in the same manner as in the foregoing example.

Figure 15:
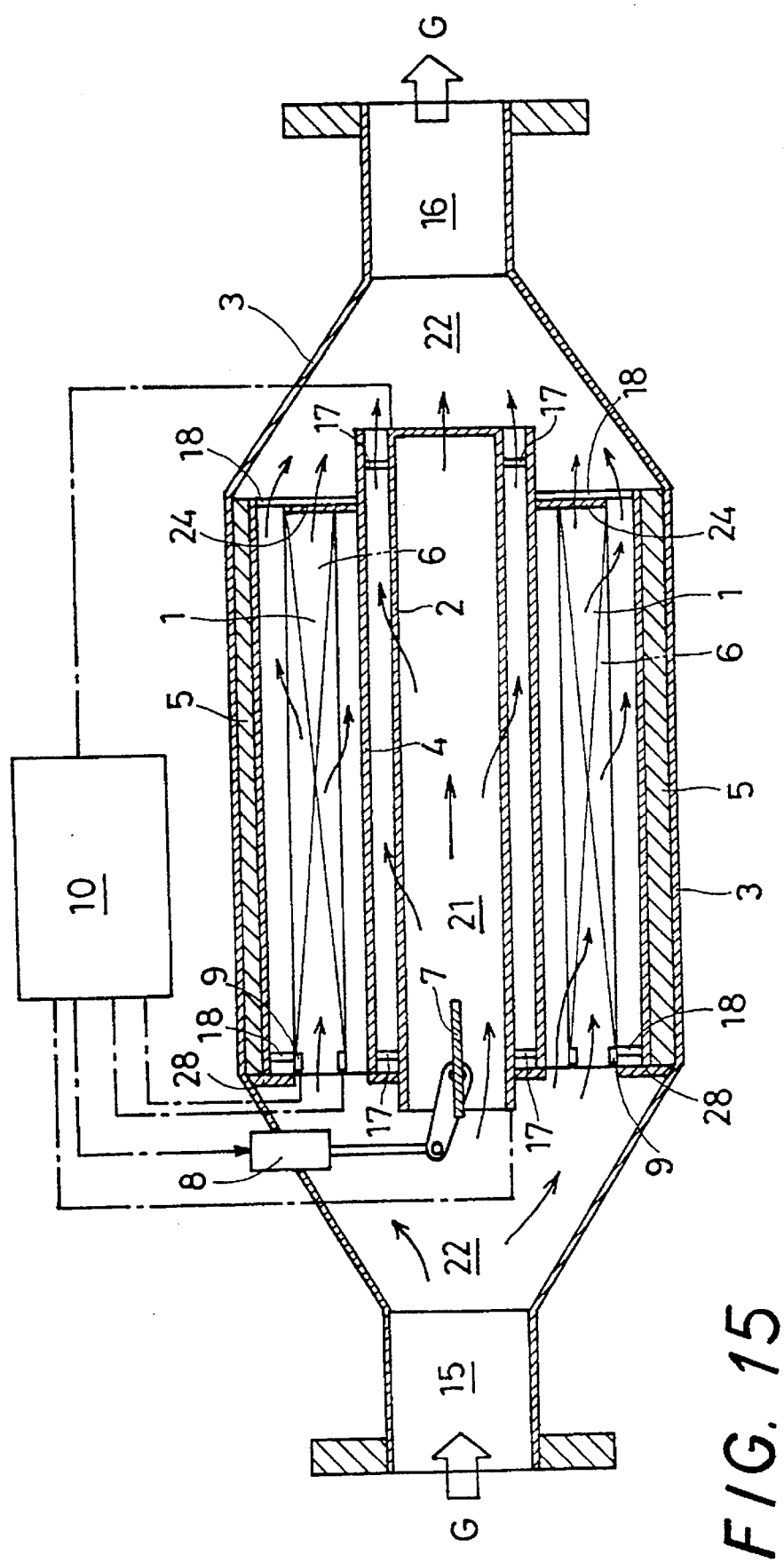
FIG. 15 is a cross-sectional view of a further example of the diesel particulate filter apparatus having a fiber material incorporated thereinto according to the present invention.

The foregoing fiber material 11 can be used to be incorporated into, for example, the diesel particulate filter apparatus as shown in FIG. 15. In this diesel particulate filter apparatus, a principal filter 1 and a subfilter 2 constituted of the filter members made of the above-mentioned fiber material 11 to enable collection therewith of particulates are separated from each other with a bypass cylinder 4 inside the case 3 and disposed in such a way as to extend in parallel with the flow of exhaust gas from an inlet 15 to an outlet 16. A heat shield 5 is disposed between the case 3 and the principal filter 1 to prevent heat from dissipating from the principal filter 1 via the case 3 out of the case 3. The principal filter 1 is disposed in the exhaust gas flow path 22. The outer peripheral end portion of the principal filter 1 on the side of the exhaust gas inlet 15 is closed with a masking shield 28, while the end of the principal filter 1 on the side of the exhaust gas outlet 16 is closed with a sheet filter 24 in the form of a plate. A bypass cylinder 4 for shielding the flow of exhaust gas between the principal filter 1 and the subfilter 2 simultaneously with heat shielding is disposed on the inner side of the principal filter 1. The subfilter 2 is disposed on the inner side of the bypass cylinder 4. The principal filter 1 and the bypass cylinder 4 are supported by and fixed to the case 3 by means of a plurality of support rods 18, while the subfilter 2 is supported by and fixed to the bypass cylinder 4 by means of a plurality of support rods 17. The subfilter 2 is disposed in a central portion of the principal filter 1 via the bypass cylinder 4 while in parallel with the flow of exhaust gas for the principal filter 1.

A heater 6 arranged on a surface of the principal filter 1 is formed in such a way as to be under such control that electricity can be turned on or off by order of a controller 10. The heater 6 extends on the whole surface of the principal filter 1 on the exhaust gas inflow side thereof along the exhaust gas flow path 22, and connected to the controller 10 via an electrode terminal 9. The heater 6 is preferably formed in the form of wire nets made of an Ni metal, with which the surfaces of the principal filter 1 and the subfilter 2 can be uniformly heated.

A bypass valve 7 for opening and closure of the inlet of the subfilter 2 is disposed on the exhaust gas inflow side of the subfilter 2. The bypass valve 7 is capable of opening or closure with an actuator 8 to be driven by order of the controller 10. In order to reproduce the subfilter 2, the bypass valve 7 may be provided with a vent hole for allowing leakage therethrough of a slight amount of exhaust gas, or the bypass valve 7 itself may alternatively be disposed in a bypass flow path 21 for allowing leakage of exhaust gas. A sensor for detecting the pressure of exhaust gas or the amount of particulates collected is provided in the case 3. Information on the pressure of exhaust gas or the amount of particulates collected, detected by the sensor, is inputted to the controller 10. Further, the controller 10 is provided with a revolution sensor for detecting the actuated state of the engine, i.e., the number of revolutions of the engine, a load sensor for detecting a load on the engine, a temperature sensor for detecting the temperature of exhaust gas, etc. The controller 10 receives detection signals corresponding to the actuated state of the engine to control the timing of opening of the bypass valve 7, i.e., the timing of reproduction of the principal filter 1, in keeping with the detected value of the pressure of exhaust gas or the amount of particulates collected. The above-mentioned timing is preliminarily determined in such a way as to correspond to the actuated state of the engine.

This diesel particulate filter having the foregoing constitution is actuated in the following manner. When the diesel engine is driven, exhaust gas is introduced into the exhaust gas flow path 22. In this stage, the bypass valve 7 is in a closed state, and exhaust gas is introduced from the inlet 15 into the exhaust gas flow path 22 and then passed from the exhaust gas flow path 22 across the principal filter 1, with which particulates such as soot, carbon and smoke contained in exhaust gas are collected, and from which cleaned exhaust gas is discharged toward the outlet 16. The collected particulates are deposited on the principal filter 1. On the other hand, the controller 10 receives the detection signals from the respective sensors, judges the actuated state of the engine from the detected values thereof, and carries out such control as to actuate the actuator 8 and open the bypass valve 7, when the amount of particulates collected reaches a predetermined value. The bypass valve 7 is opened to allow flow of exhaust gas toward the subfilter 2, while at the same time electricity is flowed through the wire net heater 6 of the principal filter 1 via the electrode terminal 9 by order of the controller 10 to heat the wire net heater 6, with which the principal filter 1 is heated to heat and incinerate the collected particulates. Specifically, particulates are incinerated using a slight amount of air contained in exhaust gas passed across the principal filter 1 to be converted into $CO_2$ and $H_2O$ and discharged in the form of a gas from the outlet 16.

During the course of reproduction of the principal filter 1, almost all of exhaust gas is first flowed across the subfilter 2 while allowing flow of a slight amount of exhaust gas across the principal filter 1. As the reproduction treatment of the principal filter 1 proceeds, however, the value of air passage resistance of the principal filter 1 is gradually lowered, while the value of air passage resistance of the subfilter 2 is gradually increased as collection of particulates in exhaust gas with the subfilter 2 proceeds. Accordingly, exhaust gas is increasingly flowed across the principal filter 1 on the basis of a balance in air passage resistance between the principal filter 1 and the subfilter 2 in keeping with the progress of the reproduction treatment of the principal filter 1. Upon completion of the reproduction of the principal filter 1, the controller 10 actuates the actuator 8 to issue an order for closure of the bypass valve 7. When the bypass valve 7 is closed, exhaust gas begins to be passed from the exhaust gas flow path 22 across the principal filter 1, while starting a normal treatment of exhaust gas, i.e., a particulates collection treatment with the principal filter 1. In the foregoing stage, particulates in exhaust gas are collected with the subfilter 2 to fall into a state of being deposited on the subfilter 2. In view of this, electricity is desirably turned on immediately after the closure of the bypass valve 7 to be flowed through the heater 6 provided on the subfilter 2 to thereby incinerate particulates collected with the subfilter 2. Specifically, the particulates are combusted using air contained in exhaust gas leaked through the bypass valve 7 to reproduce the subfilter 2.

Figure 16:
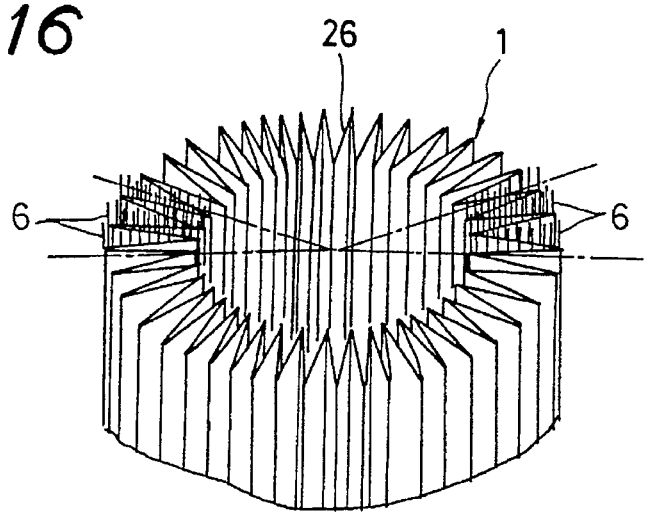
FIG. 16 is a perspective view showing an example of the element of a filter body made of a fiber material.

The filter body made of the fiber material 11 may be formed in the form of a filter element 26 as shown in FIG. 16. The filter element 26 is bent in every predetermined length in alternate radial directions to be in a ribbed profile, and then formed to be in a ribbed cylindrical form as a whole. The heater 6 is illustrated only in a partial region of an end portion of the filter element 26. The heater 6 can be projected from the whole surface of the above-mentioned end portion to form a wire net terminal.

What is claimed is:

1. A diesel particulate filter apparatus comprising filter structures comprising ceramic fiber laminate materials formed by randomly laminating a ceramic fiber, and nets laminated on said ceramic fiber laminate materials for collecting particulates contained in exhaust gas from an engine with said filter structures;

wherein said filter structures are each bent in a wavy profile and formed in a tubular form, and wherein both end portions of said filter structures further comprise first rigid members having a form fitting in said wavy profile on the inner sides of said filter structures, second rigid members having a form fitting on said wavy profile on the outer sides of said filter structures, and tubular clamping members for clamping said filter structures in the thickness-wise direction thereof on the outer sides of said second rigid members.

2. A diesel particulate filter apparatus as claimed in claim 1, wherein said first rigid members are made of a material selected from the group consisting of metals, ceramics and porous substances, and have the surfaces thereof covered with insulating layers.

3. A diesel particulate filter apparatus as claimed in claim 1, wherein said second rigid members are made of a material selected from the group consisting of metals, ceramics and porous substances, and have the surfaces thereof covered with insulating layers.

4. A diesel particulate filter apparatus as claimed in claim 1, wherein said first rigid members and said second rigid members each comprise segmented members respectively fitting in and on the wavy profiles of said filter structures.

5. A diesel particulate filter apparatus as claimed in claim 1, wherein said clamping members are constituted of tubular metal bands having a coefficient of linear thermal expansion not exceeding the coefficient of linear thermal expansion of a material constituting said first rigid members and said second rigid members.

6. A diesel particulate filter apparatus as claimed in claim 1, wherein said nets constituting said filter structures are wire nets, portions of said wire nets located on both end portions of said filter structures have a network structure of metal wires mutually crossed in directions oblique to the axial direction of said filter structures, and the portions of said wire nets other than said portions located on both end portions of said filter structures have a network structure of metal wires mutually crossed in the axial and peripheral directions of said filter structures.

7. A diesel particulate filter apparatus as claimed in claim 1, wherein said ceramic fiber laminate materials comprise nonwoven fabrics made of a ceramic fiber and woven fabrics made of a ceramic fiber and laminated on said nonwoven fabrics in both end portions of said filter structures, and wherein said woven fabrics are interposed between said nonwoven fabrics and said nets.

8. A diesel particulate filter apparatus as claimed in claim 7, wherein said ceramic fiber constituting said woven fabrics comprises 2 to 98% of $SiO_2$, and the balance of $Al_2O_3$.

9. A diesel particulate filter apparatus as claimed in claim 7, wherein said ceramic fiber constituting said woven fabrics comprises Si, and at least one element selected from the group consisting of C, O and Ti.

10. A diesel particulate filter apparatus as claimed in claim 7, wherein said woven fabrics made of said ceramic fiber have a thickness of at least 0.6 mm.

11. A diesel particulate filter apparatus comprising filter members for collecting particulates contained in exhaust gas from an engine with said filter members;

wherein said filter members comprise ceramic fiber laminate materials formed by randomly laminating a ceramic fiber, and glass layers covering the outer peripheral surfaces of said ceramic fiber laminate materials, said glass layers being made of a glass material low in Young's modulus and substantially the same in coefficient of linear thermal expansion as said ceramic fiber.

12. A diesel particulate filter apparatus as claimed in claim 11, wherein said ceramic fiber is an SiC ceramic fiber.

13. A diesel particulate filter apparatus as claimed in claim 11, wherein said glass layers are made of an oxynitride glass material.

14. A diesel particulate filter apparatus as claimed in claim 13, wherein said oxynitride glass material is any one selected from the group consisting of Mg—Al—Si—O—N, Y—Al—Si—O—N, and Li—Al—Si—O—N.

15. A diesel particulate filter apparatus as claimed in claim 11, wherein said ceramic fiber is used in the form of a multiple twist yarn of small-diameter SiC ceramic fibers twisted and drawn in the form of a yarn.

16. A diesel particulate filter apparatus as claimed in claim 11, wherein said outer peripheral surfaces of said ceramic fiber laminate materials are covered with said glass layers by coating said ceramic fiber laminate materials with a sol-gel slurry of an oxide glass capable of being converted into said glass layers, and heating the resulting coated ceramic fiber laminate materials in $NH_3$ for nitriding of said oxide glass to cover said outer peripheral surfaces of said ceramic fiber laminate materials with said glass layers.

17. A diesel particulate filter apparatus as claimed in claim 11, wherein said outer peripheral surfaces of said ceramic fiber laminate materials are covered with said glass layers by coating said ceramic fiber laminate materials with a sol-gel slurry of $LiO_2$, $Al_2O_3$, $AlF_3$, $SiO_2$ and $SiO_4$ capable of being converted into said glass layers, blended together in predetermined amounts and pulverized, and heating the resulting coated ceramic fiber laminate materials in $N_2$ to cover said outer peripheral surfaces of said ceramic fiber laminate materials with said glass layers.

\* \* \* \* \*